(12) United States Patent
Rao

(10) Patent No.: US 8,478,250 B2
(45) Date of Patent: *Jul. 2, 2013

(54) INTERACTIVE MEDIA MANAGEMENT SERVER

(76) Inventor: Bindu Rama Rao, Laguna Niguel, CA (US)

( * ) Notice: Subject to any disclaimer, the term of this patent is extended or adjusted under 35 U.S.C. 154(b) by 50 days.

This patent is subject to a terminal disclaimer.

(21) Appl. No.: 13/354,811

(22) Filed: Jan. 20, 2012

(65) Prior Publication Data

US 2012/0122434 A1    May 17, 2012

Related U.S. Application Data

(63) Continuation-in-part of application No. 11/888,100, filed on Jul. 30, 2007, now Pat. No. 8,131,270.

(51) Int. Cl.
    *H04B 1/04*     (2006.01)
(52) U.S. Cl.
    USPC ........ 455/414.1; 455/566; 455/557; 345/594; 725/143; 725/105
(58) Field of Classification Search
    USPC ................ 455/412.1, 414.1, 550.1, 557, 463, 455/566; 345/594, 650, 661, 676, 547; 725/93, 725/116, 105, 60, 61, 9, 86, 143, 114, 138, 725/144

See application file for complete search history.

(56) References Cited

U.S. PATENT DOCUMENTS

| | | | | |
|---|---|---|---|---|
| 6,502,242 | B1* | 12/2002 | Howe et al. | 725/109 |
| 8,191,104 | B2* | 5/2012 | Gordon et al. | 725/151 |
| 2001/0023436 | A1* | 9/2001 | Srinivasan et al. | 709/219 |
| 2002/0108109 | A1* | 8/2002 | Harris et al. | 725/32 |
| 2005/0060759 | A1* | 3/2005 | Rowe et al. | 725/143 |
| 2005/0288999 | A1* | 12/2005 | Lerner et al. | 705/14 |
| 2007/0113263 | A1* | 5/2007 | Chatani | 725/135 |

* cited by examiner

*Primary Examiner* — Kamran Afshar
*Assistant Examiner* — Marisol Fahnert

(57) ABSTRACT

An interactive media management server that facilitates management of interactive media and delivery of such interactive media. It comprises a first interface to an interactive media distribution server communicatively coupled to a plurality of mobile devices, and a second interface to a service provider system or a content provider system. It comprises a manager module for managing creation, distribution and tracking of a plurality of interactive media. The manager module, via the second interface, manages the delivery of the plurality of interactive media from the service provider system or the content provider system, and the communication of user responses to the plurality of interactive media to the corresponding service provider system or content provider system.

22 Claims, 3 Drawing Sheets

INTERACTIVE MEDIA MANAGEMENT SERVER

CROSS REFERENCES TO RELATED APPLICATIONS

The present patent application is a continuation-in-part (CIP) of, claims priority to, and makes reference to United States non-provisional patent application Ser. No. 11/888,100, entitled "SYSTEM FOR PROVIDING INTERACTIVE MEDIA TO USER OF MOBILE DEVICE", filed on Jul. 30, 2007 now U.S. Pat. No. 8,131,270. The complete subject matter of the above-referenced United States Patent Application is hereby incorporated herein by reference, in its entirety.

This patent application makes reference to U.S. patent application Ser. No. 11/977,764 entitled "MEDIA DISTRIBUTION SERVER THAT PRESENTS INTERACTIVE MEDIA TO A MOBILE DEVICE," filed on Oct. 25, 2007. The complete subject matter of the above-referenced United States Patent Application is hereby incorporated herein by reference, in its entirety.

BACKGROUND

1. Technical Field

The present invention relates generally to management of media; and, more particularly, to management of interactive media that is distributed to mobile devices.

2. Related Art

Cell (mobile) phones are widely used as mobile devices to communicate anywhere in the world. Some of them are very simple devices capable of voice communication alone. Many other today's mobile devices are used for multiple purposes, other than voice communication, in any convenient location. They keep record of appointments and schedules, store addresses, present calendars, surf Internet, play games among many other purposes. They are capable of playing music and other audio clips, and also play video clips and movies. They can be networked with external devices such as other mobile phones, laptops and personal computers and modems via infrared, Bluetooth and wifi interfaces. This enormously increases their functionality when compared to just few years ago.

Very few mobile devices are capable of displaying interactive media. Very few servers are equipped with the technologies and tools needed to distribute interactive media and adequately support user interactions—they are more likely to just support download by user of streaming content, such as a video from YouTube or a song from iTunes server. Users are therefore forced to passively watch video clips delivered from YouTube service or passively listen to songs downloaded from servers such as iTunes servers and others of that kind.

Today's mobile devices have extensive processing ability and capable accomplishing many tasks that were usually meant for personal computer alone. However, battery life is always a concern, with batteries needing to be charged every couple of days. Some modern mobile devices have wide screens with alpha numeric keyboards and many soft (programmable) keys. These devices are programmable and have ability to download programs such as XML (eXtensible Markup Language) files and run them on mobile devices. These programs accomplish many tasks such as managing daily tasks, assisting marketing, keeping data and files stored, managing databases etc. However, today the range of these programs are very limited and they accomplish far less tasks than there is demand among people.

The iTunes service from Apple Corp. provides a server based music distribution service. However, it does not distribute interactive media, or other content created by/for enterprises, content providers, etc. The YouTube service provided by Google Inc. makes it possible for users t upload videos taped by them, and other users to download it or view it on the web. However, it does not provide interactive media, and it does not provide surveys based on interactive media, and in addition, it does not provide means to manage interactive media.

Microsoft Content Management Server facilitates storing and distributing content, but it does not seem to support management of interactive media, the management of the distribution of interactive media, gathering user responses for those interactive media, sending the user responses to content and service providers, providing report generation facilities for user responses collected, etc.

Thus there is a need in the market for a management server for managing interactive media, the distribution of interactive media. There is a need for a management server one that not only supports distributing interactive media by one or more servers, but also facilitates gathering user responses for those interactive media, sending the user responses to content and service providers, providing report generation facilities for user responses collected, etc. There is need for a management server for interactive media that helps manage the life-cycle of interactive media, and subscription to services that provide interactive media, and billing associated with distributing interactive media—all the features provided by the present invention.

These and other limitations and deficiencies associated with the related art may be more fully appreciated by those skilled in the art after comparing such related art with various aspects of the present invention as set forth herein with reference to the figures.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE DRAWINGS

Figure 1:
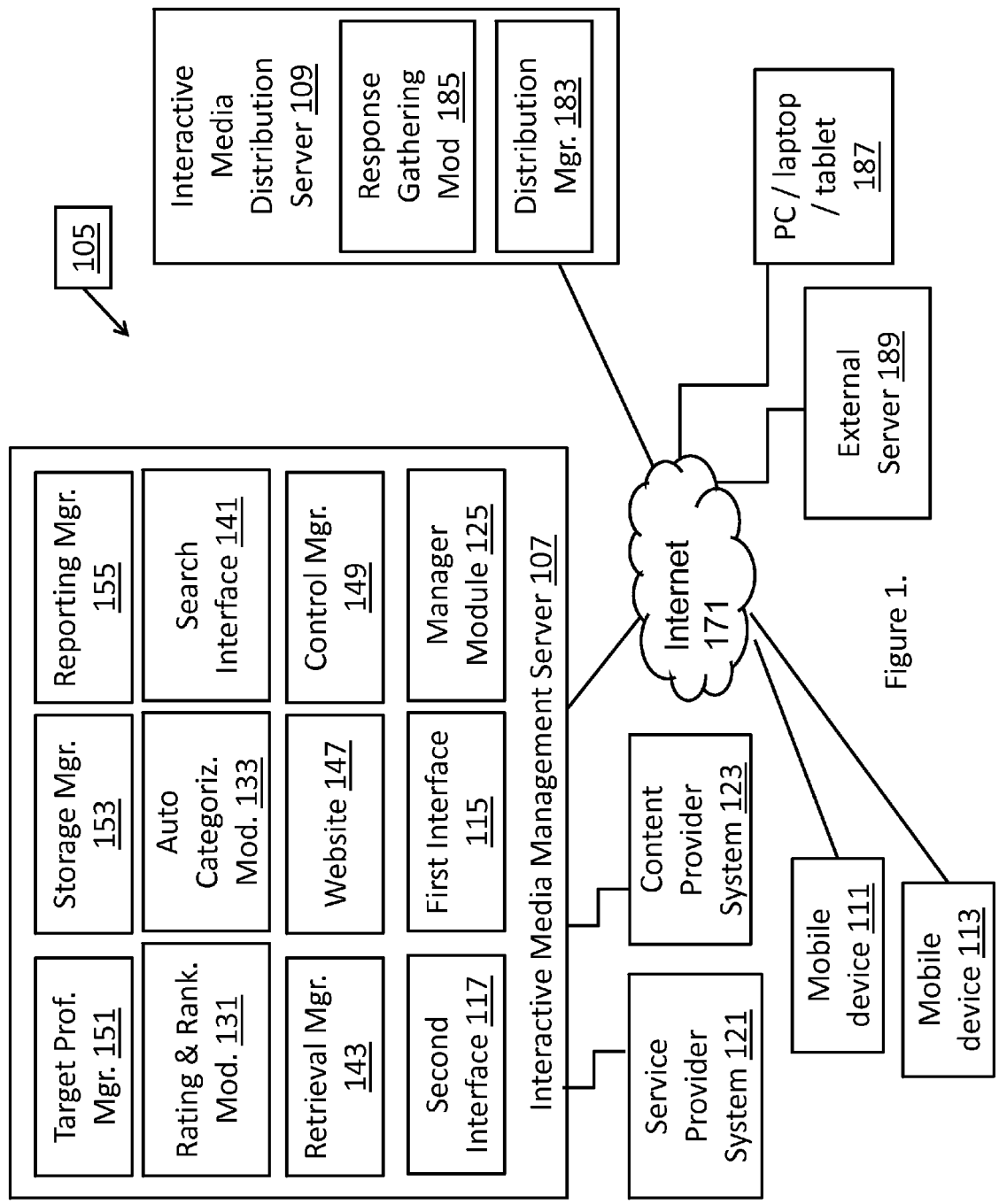
FIG. 1 is a schematic block diagram illustrating an interactive media management server that not only supports distribution of interactive media by one or more servers, but also facilitates gathering user responses for those interactive media, sending the user responses to content and service providers, providing report generation facilities for user responses collected, etc.

FIG. 1 is a schematic block diagram illustrating an interactive media management server 107 that not only supports distribution of interactive media by one or more servers, but also facilitates gathering user responses for those interactive media, sending the user responses to content and service providers, providing report generation facilities for user responses collected, etc. The interactive media management server 107 for interactive media that helps manage the life-cycle of interactive media, and subscription to services that provide interactive media, and billing associated with distributing interactive media The interactive media management server 107 comprises a first interface 115 to an interactive media distribution server 109 communicatively coupled to a plurality of mobile devices 111, 113, and a second interface 117 to a service provider system 121 or a content provider system 123. It comprises a manager module 125 for managing creation, distribution and tracking of a plurality of interactive media. The manager module 125, via the second interface 117, manages the delivery of the plurality of interactive media from the service provider system 121 or the content provider system 123, and the communication of user responses to the plurality of interactive media to the corresponding service provider system 121 or content provider system 123.

The manager module 125 selectively facilitates storage, status change to active or inactive, updates, removal, replacement, ranking, rating, comments, feedback and tracking of usage for each of the plurality of interactive media via the first interface 115. It also manages the distribution of interactive media and the life-cycle of the interactive media. A rating and ranking module 131 in the interactive media management server 107 is configured at least to generate ratings and rankings for the plurality of interactive media based at least on the user inputs, and an automatic categorization module 133 categorizes interactive media as it is received from the service provider system 121, content provider system 123 or from one or more of the plurality of mobile devices 111, 113 communicatively coupled to the interactive media distribution server 109.

The interactive media management server 107 also comprises a search interface 141 that is used for retrieval of at least one of the plurality of interactive media and a retrieval manager 143 that coordinates providing a sample portion of at least one of the plurality of interactive media before selectively providing the entire version of the at least one of the plurality of interactive media, as necessary.

The manager module 125 manages the delivery of samples of, or references to, the plurality of interactive media, to the plurality of mobile devices 111, 113 based at least on recent retrievals by users of the plurality of mobile devices 111, 113. The manager module 125 automatically generates a report, and presents it to one or more recipients as required, wherein the report comprises recent user inputs received from users of the plurality of mobile devices 111, 113. Recent user inputs received are those received during a period of a day, a week, a month or a set duration specified.

The manager module 125 identifies an appropriate advertisement for each of the plurality of mobile devices 111, 113 based at least on previous advertisements presented and previous retrievals of interactive media from the corresponding one of the plurality of mobile devices 111, 113.

The interactive media management server 107 regularly communicates retrieval and user input data to the service provider system 121 or content provider system 123, wherein such communication is in live mode if necessary and in batched mode by default.

The interactive media management server 107 also comprises a website 147 for creation of interactive media by a plurality of interactive media providers, a control manager 149, a target profile manager 151, a storage manager 153 and a reporting manager 155. The website 147 also provides a report generation facility for retrieval of user inputs provided by users to specific ones of the plurality of interactive media in an XML format, CSV format, PDF format, HTML or text format.

The control manager 149 assigns and manages a start date and an end date to each of the plurality of interactive media, as necessary. The target profile manager 151 determines a target user profile for at least one of the plurality of interactive media and facilitates distribution of the at least one of the plurality of interactive media based on the target user profile. The storage manager 153 creates, in an automated fashion, a database and associated tables for collecting responses to individual interactive media, as necessary. It also provides references to uploaded audio, photo and video data provided by users as part of their user inputs to specific ones of the plurality of interactive media, wherein such references are used for communicating collected responses to individual interactive media to external servers. The reporting manager 155 presents or forwards, in an automated fashion, a report created daily, weekly, and monthly, comprising usage, ranking, rating, comments, feedback and other related information, for each of the plurality of interactive media.

In one embodiment, the interactive media management server 107 also comprises a sample generator module that generates a sample version of one of the plurality of interactive media. In general, a sample is a subset of a complete original version of the interactive media. For example, a sample of an interactive movie/video that is 1 hour long can be an interactive trailer that is 2 minutes long. In addition, the manager module 125, by default, facilitates the delivery of the sample version of the one of the plurality of interactive media. It also, when requested, provides the original version of the one of the plurality of interactive media. In a related embodiment, the interactive media management server 107 has a media distribution server 109 that is integrated into the interactive media management server 107, and the interactive media management server 107 is also capable of distributing the plurality of interactive media to the plurality of mobile devices 111, 113 and receives user inputs from the plurality of mobile devices 111, 113 and processes them.

In a different embodiment, the interactive media management server 107 also comprises a edge caching interface 161 that makes it possible to configure an external edge caching cache 163 for subsets of components of each of the plurality of interactive media based on their usage and a locale associated with each of the plurality of mobile devices 111, 113. The edge caching interface 161 selectively makes a copy of a specific interactive media at a preset interval and communicates this copy to the external edge caching cache 163 that is located in a close geographical proximity to a significant number of the plurality of mobile devices 111, 113.

In one embodiment, the interactive media management server 107 also comprises the interactive media distribution server 109, and provides all the features of the interactive media distribution server 109. Thus is combines management of interactive media with distribution of interactive media and collecting user responses for the interactive media (and management of such user responses).

Figure 2:
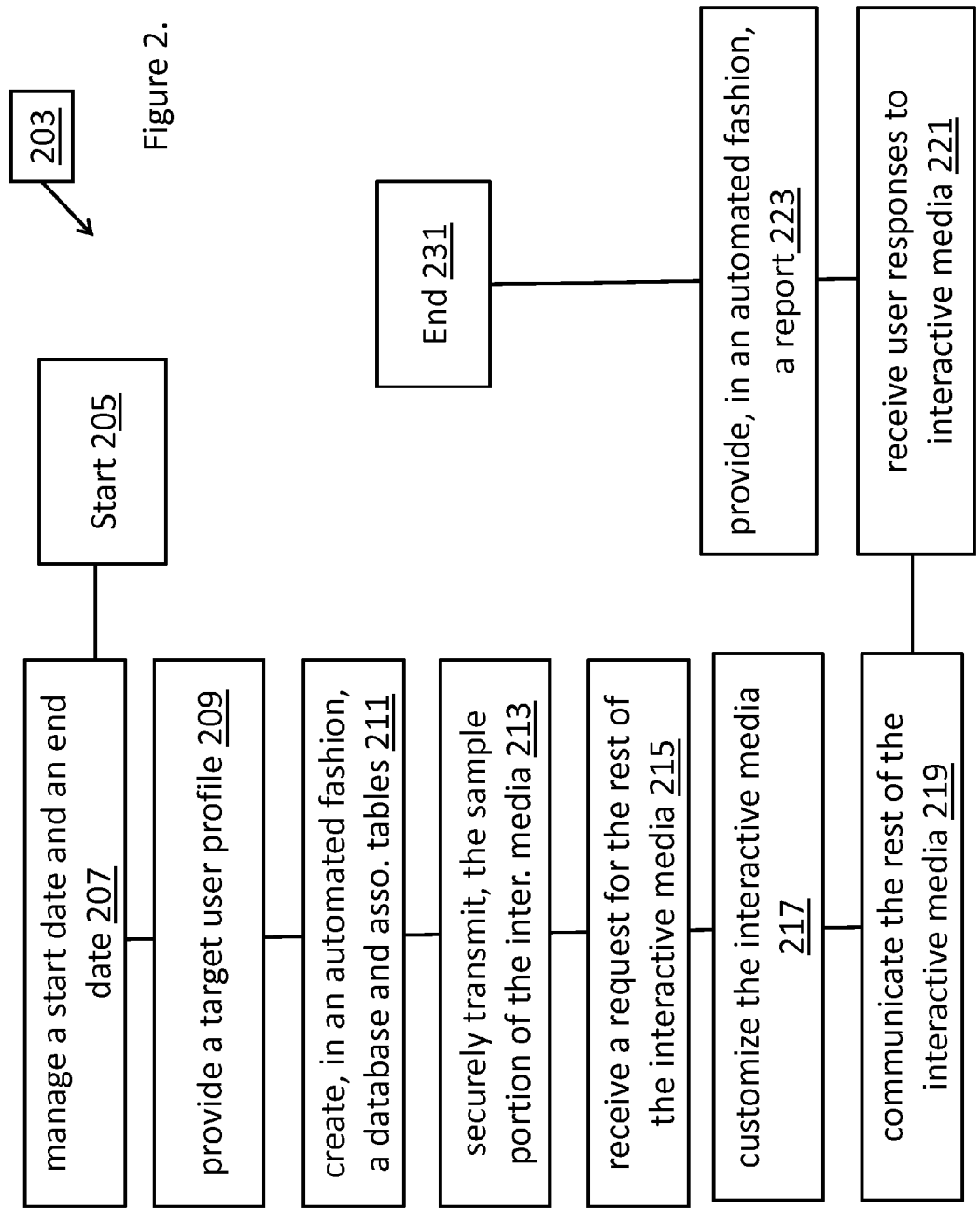
FIG. 2 is a flow chart that describes an exemplary operation of an interactive media management server, as it manages the acquisition, generation and collecting of interactive media, the distribution of interactive media, managing the life-cycle of interactive media, etc.

FIG. 2 is a flow chart that describes an exemplary operation of an interactive media management server 107, as it manages the acquisition, generation and collecting of interactive media, the distribution of interactive media, the life-cycle of interactive media, etc. At a start block 205, the operation starts when the interactive media management server 107 receives an interactive media from a content provider system or a service provider system. It optionally arranges, by using a configuring module, the received interactive media into an initial sample portion and a rest of the interactive media portion. It assigns it a status of "active" by default, although other life-cycle status such as "inactive", "deleted", "suspended", etc. may be assigned as necessary.

The interactive media management server 107, at a next block 207, manages a start date and an end date for each of a plurality of interactive media that requires such settings. Then, at a next block 209, it provides a target user profile for each of a plurality of interactive media. Such target user profile may be submitted along with an associated interactive media by an advertisement company that provides ads, a content provider providing content, a service provider offering an interactive media as part of a service delivery, etc.

In one embodiment, while managing newly received interactive media, at a next block 211, the interactive media management server 107 creates, in an automated fashion, a database (if necessary) and associated tables (as needed) for collecting responses to each of a plurality of interactive media, as necessary. For example, it might create one new table for each new interactive media received. Or it might use the same table for responses received for all interactive media that originate from one source, such as a specific content provider, or a specific company.

At a next block 213, the an interactive media management server 107 securely transmits, employing a transmitting module, the sample portion of the interactive media initially to the electronic device such as a mobile device 111, tablet, or a PC/laptop. Then, at a next block 215, it receives a request for the rest of the interactive media from the electronic device subsequently. Then, at a next block 217, it customizes the rest of the interactive media based at least on the locale associated with the electronic device. At a next block 219, it also communicates the rest of the interactive media to the electronic device. In one embodiment, customizing is also based on an interest shown by a user of the electronic device in various categories of interactive media or based on the participation of the user in one or more social networks.

Then, at a next block 221, the interactive media management server 107 receives user responses to interactive media reviewed by/used by users (from mobile devices, tablets, PCs/laptops, etc.). It also provides references to uploaded audio, photo and video data provided by users as part of their user inputs to specific ones of the plurality of interactive media, wherein such references are used for communication of collected responses to individual ones of the plurality of interactive media to external servers (such as a content provider system or service provider system, etc.).

Then, at a next block 223, the interactive media management server 107 provides, in an automated fashion, a report created daily, weekly, and monthly, to one or more registered recipients. Alternatively, registered users can create such reports using the website associated. Such reports typically comprise usage, ranking, rating and other related information, for each of the plurality of interactive media (that the user is interested in). In addition, customized reports are supported for each service provider/content provider/company/client who may have subscribed to a reporting service.

Finally, at an end block 231, it terminates processing of the operation.

In one embodiment, the interactive media management server 107 supports verifying, from subscription records, whether the user has a subscription to a service that provides access to a requested one of a plurality of interactive media, in the block 213. It provides the requested one of the plurality of interactive media after verifying that the user has an active subscription to access the requested one of the plurality of interactive media.

In one embodiment, in the block 221, the interactive media management server 107 receives, from the user, in response to the interactive media, a user input wherein the user input comprises at least one or more photos, one or more recorded audio, or one or more video clips. It then makes the received one or more photos, one or more recorded audio, or one or more video clips available for review and processing by at least one authorized manager via a website page associated with the interactive media management server 107. It also provides access selectively to the at least one or more photos, one or more recorded audio, or one or more video clips from an external server for processing and storage. Thus, portions of user responses can be selectively retrieved and stored in external storages, and included in reports generated and shared with service providers, content providers, creators and owners of interactive media, etc.

Figure 3:
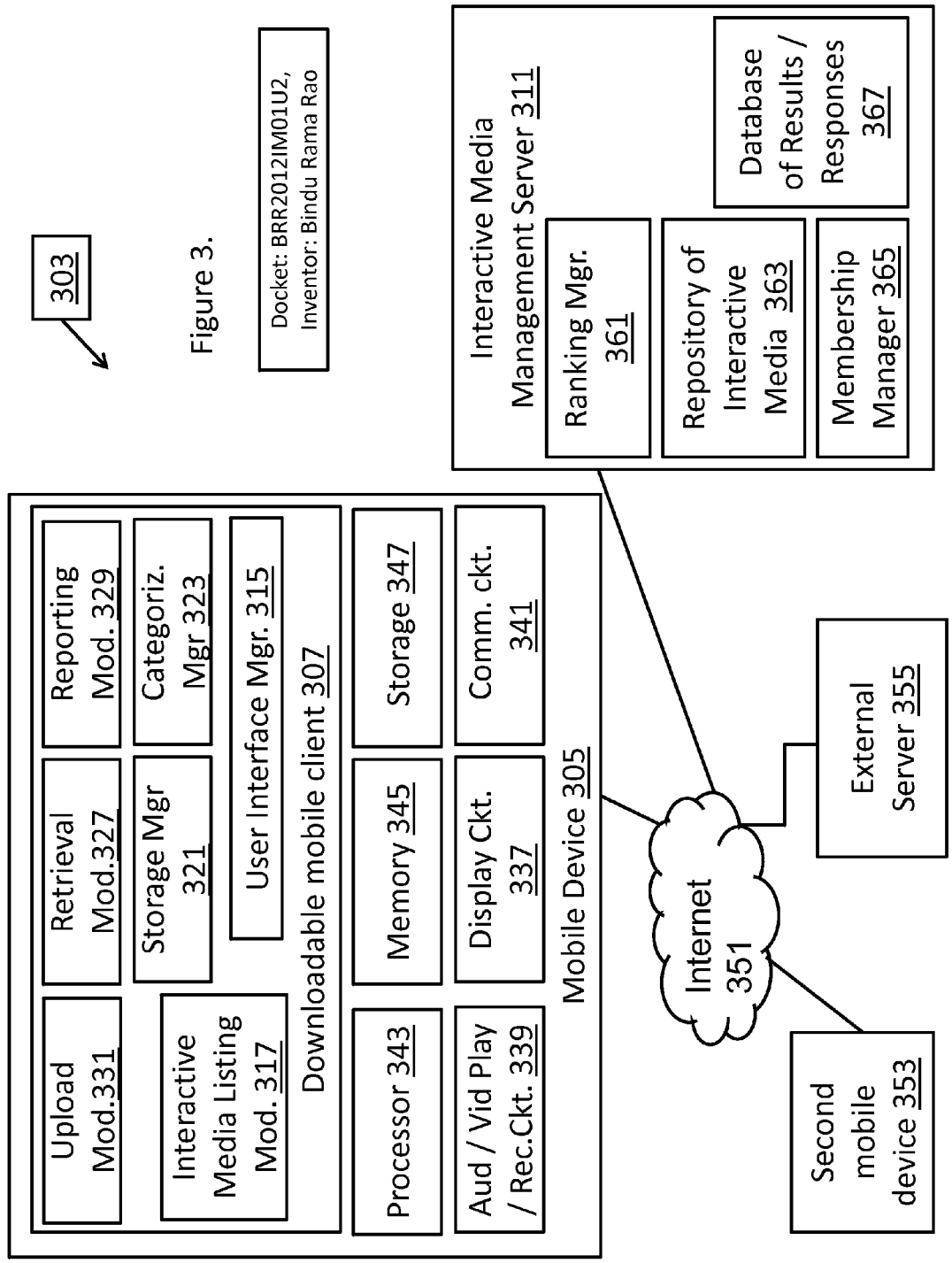
FIG. 3 is a perspective block diagram of a mobile device that comprises a mobile client that is capable of displaying, and letting a user interact with, an interactive media.

FIG. 3 is a perspective block diagram of a mobile device 305 that comprises a mobile client 307 that is capable of displaying, and letting a user interact with, an interactive media. The mobile client 307 in the mobile device 305 interacts with the interactive media management server 311 and presents interactive media under the management of the interactive media management server 311. The mobile client 307 comprises a user interface manager 315 that is configured to receive user inputs provided by a user as the mobile client 307 displays an interactive media, wherein the user inputs is subsequently associated with the interactive media currently being displayed. It also comprises an interactive media listing module 317 that also displays ratings and rankings to aid selection of the interactive media.

The mobile device 305 comprises a display circuitry 337, an audio/video playback & recording circuitry 339, a processor 343, a memory 345, a storage 347, at least one wireless communication means 341, etc. in addition to the mobile client 307.

The mobile client 307 also comprises a storage manager 321 capable of receiving, storing and playing the interactive media as it is received, and a categorization module 323 that identifies a category for the interactive media and a category of the user inputs provided by a user. It also comprises a retrieval module 327 that retrieves the interactive media and also comprises a search interface for the searching and the retrieval of the interactive media, and a reporting module 329 that communicates to the interactive media management server the user inputs provided by the user along with an identified category of the user inputs and metadata associated with the user inputs.

The mobile client 307 receives and selectively displays a sample portion of at least one of the plurality of interactive media, and, if requested by the user, subsequently retrieves the rest of the at least one of the plurality of interactive media. The user inputs provided by a user after reviewing a typical interactive media (customized optionally to a user by a server 311) comprises user selections from drop-down lists provided, radio button selections, recorded audio provided by user employing a microphone available in the mobile device, a photo taken by the user using a camera available in the mobile device, a video clip taken by the user, and optional text data inputs provided by the user in response to text input solicitations.

The mobile client 307 also comprises an upload module 331 that uploads the recorded audio, a photo, and a video clip taken by the user to the interactive media management server 311. The upload module 331 retrieves references to such uploaded data. The mobile client 307 incorporates the references to uploaded data into a response message that also comprises user selections for drop-down lists, text inputs, user selections to the radio button selections. The mobile client 307 sends the response packet to the interactive media management server 311 for processing.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Circuits and circuitry may comprise general or specific purpose hardware, or may comprise such hardware and associated software such as firmware or object code.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. An interactive media management server, the interactive media management server comprising:
   a first interface to an interactive media distribution server communicatively coupled to a plurality of mobile devices;
   a second interface to a service provider system or a content provider system;
   a manager module for managing creation, distribution and tracking of a plurality of interactive media;
   the manager module, via the second interface, managing the delivery of the plurality of interactive media from the service provider system or the content provider system, and the communication of user responses to the plurality of interactive media to the corresponding service provider system or content provider system;
   the manager module selectively facilitating storage, status change to active or inactive, updates, removal, replacement, ranking, rating and tracking of usage for each of the plurality of interactive media via the first interface; and
   the manager module managing the distribution of interactive media and the life-cycle of the interactive media.

2. The interactive media management server of claim 1 further comprising:
   a rating and ranking module configured at least to generate ratings and rankings for the plurality of interactive media based at least on the user inputs;
   an automatic categorization module that categorizes interactive media as it is received from the service provider system, content provider system or from one or more of the plurality of mobile devices communicatively coupled to the interactive media distribution server;
   a search interface for retrieval of at least one of the plurality of interactive media; and
   a retrieval manager that coordinates providing a sample portion of at least one of the plurality of interactive media before selectively providing the entire version of the at least one of the plurality of interactive media, as necessary.

3. The interactive media management server of claim 1 wherein the manager module manages the delivery of samples of, or references to, the plurality of interactive media, to the plurality of mobile devices based at least on recent retrievals by users of the plurality of mobile devices.

4. The interactive media management server of claim 1 wherein the manager module automatically generates a report, and presents it to one or more recipients as required, wherein the report comprises recent user inputs received from users of the plurality of mobile devices.

5. The interactive media management server of claim 4 wherein recent user inputs received are those received during a period of a day, a week, a month or a set duration specified.

6. The interactive media management server of claim 1 wherein the manager module identifies an appropriate advertisement for each of the plurality of mobile devices based at least on previous advertisements presented and previous retrievals of interactive media from the corresponding one of the plurality of mobile devices.

7. The interactive media management server of claim 1 wherein the interactive media management server regularly communicates retrieval and user input data to the service provider system or content provider system, wherein such communication is in live mode if necessary and in batched mode by default.

8. The interactive media management server of claim 1 also comprising:
   a website for creation of interactive media by a plurality of interactive media providers; and the website also provides a report generation facility for retrieval of user inputs provided by users to specific ones of the plurality of interactive media in an XML format, CSV format, PDF format, HTML or text format.

9. The interactive media management server of claim 1 also comprising:
a control manager that assigns and manages a start date and an end date to each of the plurality of interactive media, as necessary;
a target profile manager that determines a target user profile for at least one of the plurality of interactive media and facilitates distribution of the at least one of the plurality of interactive media based on the target user profile;
a storage manager that creates, in an automated fashion, a database and associated tables for collecting responses to individual interactive media, as necessary;
the storage manager also providing references to uploaded audio, photo and video data provided by users as part of their user inputs to specific ones of the plurality of interactive media, wherein such references are used for communicating collected responses to individual interactive media to external servers; and
a reporting manager for presenting or forwarding, in an automated fashion, a report created daily, weekly, and monthly, comprising usage, ranking, rating and other related information, for each of the plurality of interactive media.

10. The interactive media management server of claim 1 also comprising:
a sample generator module that generates a sample version of one of the plurality of interactive media;
the manager module by default facilitating the delivery of the sample version of the one of the plurality of interactive media by default; and
the manager module, when requested, providing the original version of the one of the plurality of interactive media.

11. The interactive media management server of claim 10 wherein the media distribution server is integrated into the interactive media management server and the interactive media management server is also capable of distributing the plurality of interactive media to the plurality of mobile devices and receives user inputs from the plurality of mobile devices and processes them.

12. The interactive media management server of claim 1 also comprising:
a edge caching interface that makes it possible to configure an external edge caching cache for subsets of components of each of the plurality of interactive media based on their usage and a locale associated with each of the plurality of mobile devices; and
the edge caching interface selectively makes a copy of a specific interactive media at a preset interval and communicates this copy to the external edge caching cache that is located in a close geographical proximity to a significant number of the plurality of mobile devices.

13. A method of operating an interactive media management server comprising:
arranging, by a configuring module, an interactive media into an initial sample portion and a rest of the interactive media portion;
securely transmitting, by a transmitting module, the sample portion of the interactive media to the electronic device initially;
receiving a request for the rest of the interactive media from the electronic device subsequently;
customizing the rest of the interactive media based at least on the locale associated with the electronic device; and
communicating the rest of the interactive media to the electronic device.

14. The method of claim 13 wherein customizing is also based on an interest shown by a user of the electronic device in various categories of interactive media or based on the participation of the user in one or more social networks.

15. The method of claim 13 further comprising:
managing start date and end date for each of a plurality of interactive media;
providing a target user profile for each of a plurality of interactive media;
creating in an automated fashion a database and associated tables for collecting responses to each of a plurality of interactive media, as necessary;
providing references to uploaded audio, photo and video data provided by users as part of their user inputs to specific ones of the plurality of interactive media, wherein such references are used for communicating collected responses to individual ones of the plurality of interactive media to external servers; and
reporting, in an automated fashion, a report created daily, weekly, and monthly, comprising usage, ranking, rating and other related information, for each of the plurality of interactive media.

16. The method of claim 14 further comprising:
verifying, from subscription records, whether the user has a subscription to a service that provides access to a requested one of a plurality of interactive media; and
providing the requested one of the plurality of interactive media after verifying that the user has a active subscription to access the requested one of the plurality of interactive media.

17. The method of claim 14 further comprising:
getting, from the user, in response to the interactive media, a user input wherein the user input comprises at least one or more photos, one or more recorded audio, or one or more video clips; and
making the received one or more photos, one or more recorded audio, or one or more video clips available for review and processing by at least one authorized manager via a website page.

18. The method of claim 17 further comprising:
providing access selectively to the at least one or more photos, one or more recorded audio, or one or more video clips from an external server for processing and storage.

19. A mobile client in a mobile device that interacts with the interactive media management server, the mobile client comprising:
a user interface manager configured to receive a user inputs provided by a user as the mobile client displays an interactive media, wherein the user inputs is subsequently associated with the interactive media currently being displayed, the user interface manager displaying any interactive media, received or retrieved, to the user;
an interactive media listing module that also displays ratings, comments, feedback and rankings to aid selection of the interactive media by the user;
a storage module capable of receiving, storing and playing the interactive media as it is received;
a categorization module that identifies a category for the interactive media and a category of the user inputs provided by a user;

a retrieval module that retrieves the interactive media and also comprises a search interface for the searching and the retrieval of the interactive media; and a reporting module that communicates to the interactive media management server the user inputs provided by the user along with an identified category of the user inputs and metadata associated with the user inputs.

20. The mobile client of claim 19 receives and selectively displays a sample portion of at least one of the plurality of interactive media, and, if requested by the user, subsequently retrieves the rest of the at least one of the plurality of interactive media.

21. The mobile client of claim 20 wherein the user inputs comprises user selections from drop-down lists provided, radio button selections, recorded audio provided by user employing a microphone available in the mobile device, a photo taken by the user using a camera available in the mobile device, a video clip taken by the user, and optional text data inputs provided by the user in response to text input solicitations.

22. The mobile client of claim 21 the mobile client further comprising:

an upload module that uploads the recorded audio, a photo, and a video clip taken by the user to the interactive media management server;

the upload module retrieves references to such uploaded data;

the mobile client incorporates the references to uploaded data into a response message that also comprises user selections for drop-down lists, text inputs, user selections to the radio button selections; and the mobile client sends the response packet to the interactive media management server for processing.

* * * * *